(12) United States Patent
Massanetz et al.

(10) Patent No.: US 7,341,273 B2
(45) Date of Patent: Mar. 11, 2008

(54) AIR-BAG MODULE WITH FLOATING GAS GENERATOR DIFFUSER

(75) Inventors: Klaus Massanetz, Wartenberg (DE); Pavel Kurilow, Leipzig (DE)

(73) Assignee: Autoliv Development AB, Vargarda (SE)

( * ) Notice: Subject to any disclaimer, the term of this patent is extended or adjusted under 35 U.S.C. 154(b) by 196 days.

(21) Appl. No.: 11/059,020

(22) Filed: Feb. 16, 2005

(65) Prior Publication Data

US 2005/0212274 A1 Sep. 29, 2005

(30) Foreign Application Priority Data

Feb. 19, 2004 (DE) ............ 10 2004 008 043

(51) Int. Cl.
*B60R 21/16* (2006.01)
*B60R 21/26* (2006.01)

(52) U.S. Cl. ............... 280/728.2; 280/736; 280/740

(58) Field of Classification Search ........... 280/740, 280/736, 728.2
See application file for complete search history.

(56) References Cited

U.S. PATENT DOCUMENTS

| 5,234,229 | A | | 8/1993 | Gordon |
| 6,361,065 | B1 | * | 3/2002 | Frisch ............ 280/728.2 |
| 6,435,540 | B1 | * | 8/2002 | Durre ............ 280/728.2 |
| 6,439,599 | B1 | * | 8/2002 | Laue et al. ........ 280/731 |
| 6,464,247 | B1 | * | 10/2002 | Laue ............ 280/728.2 |
| 6,592,141 | B1 | * | 7/2003 | Dancasius et al. ..... 280/728.2 |
| 6,679,518 | B2 | * | 1/2004 | Varcus et al. ........ 280/728.2 |
| 6,814,369 | B2 | * | 11/2004 | Heindl ............ 280/728.2 |
| 7,246,816 | B2 | * | 7/2007 | Lorenz et al. ........ 280/728.2 |
| 2002/0125704 | A1 | * | 9/2002 | Heindl ............ 280/740 |

FOREIGN PATENT DOCUMENTS

| DE | 298 16 925 U1 | 1/1999 |
| DE | 199 55 426 A1 | 6/2001 |
| EP | 1 010 589 A2 | 6/2000 |

* cited by examiner

*Primary Examiner*—Paul N. Dickson
*Assistant Examiner*—Joselynn Y. Sliteris
(74) *Attorney, Agent, or Firm*—Brinks Hofer Gilson & Lione

(57) ABSTRACT

An airbag module having a gas generator mounted on a carrier using at least one vibration-damping mounting. The gas generator has radially projecting flange sections for connecting one end of the vibration-damping mounting and a diffusor, which is pot-shaped in configuration, overlaps the gas generator, including its flange sections, and wherein the surrounding side wall of the pot-shaped diffusor is bent at a right angle. One end of the vibration-dampening mounting (16) is provided with a head (17), which acts as a limit stop for the gas generator (10) for lateral movements of the gas generator (10) that occur in the plane of the flange sections (15).

5 Claims, 2 Drawing Sheets

AIR-BAG MODULE WITH FLOATING GAS GENERATOR DIFFUSER

CROSS REFERENCE TO RELATED APPLICATION

This application claims priority to German Patent Application No. 10 2004 008 043.7, filed Feb. 19, 2004.

BACKGROUND OF THE INVENTION

The invention relates to en airbag module having a gas generator mounted on a carrier using at least one vibration-damping mounting. The gas generator includes radially projecting flange sections for connecting one end of the vibration-damping mounting, and a diffuser which is pot-shaped and overlaps the gas generator including its flange sections. The surrounding side wall of the pot-shaped diffuser is bent at a right angle and, because of the bending, forms a wall area extending parallel to the flange sections of the gas generator.

An airbag module having the above characteristics is generally described in EP 1 010 589 A2. In that patent application the gas generator is provided with an external surrounding flange to which is screwed at least one mounting consisting of an elastic material, preferably rubber, that provides vibration damping for the mounting.

In accordance with the prior art, the opposite end of the mounting is likewise screwed and fastened to the base plate of the module housing. The gas generator is thus decoupled from the module housing to float so that the gas generator can act as a freely vibrating countermass to vibrations transmitted to the steering-wheel assembly to dampen vibrations when the vehicle is in operation. In accordance with the prior art, the gas generator is overlapped by a pot-shaped diffuser, whose surrounding side wall is bent at a right angle and includes a wall area that is formed by the bending and extends parallel to the flange of the gas generator. An appropriate fastener connects the diffuser to the module housing on an external radially projecting, flange-like edge.

In the known airbag module, there occurs the problem that the gas generator, which is float-mounted inside the diffuser, can hit the inside of the pot-shaped diffuser when lateral movements of the gas generator occur in the plane of the flange sections of the gas generator, and cause undesirable noises.

It is therefore the object of the invention to provide an airbag module in which noises are prevented due to is relative movement between the gas generator and the diffusor.

This object, including advantageous embodiments and further developments, is achieved by the contents of the claims that follow this description.

SUMMARY OF THE INVENTION

According to the present invention, one end of the vibration-dampening mounting is provided with a head which acts as a limit stop for the gas generator for lateral movements of the gas generator that occur in the plane of the flange sections. An advantage of the present invention is that the fitting arrangement of the limit stop on the mounting, which consists of an elastic material such as rubber, silicon or crude rubber, prevents the gas generator from hitting the diffusor during lateral movements. The head of the vibration-dampening mounting catches the gas generator beforehand.

In one embodiment of the invention, the gas generator is fastened directly on the diffuser. A plurality of mountings, which are arranged distributed across the perimeter of the gas generator and diffuser and fastened to the flange sections of the gas generator, pass through the edge region of the diffusor in assigned holes and are connected to the diffuser. The particular advantage connected therewith is that the connection of the diffuser and gas generator makes it possible to preassemble these components into one subassembly, which then needs only to be integrated into the housing of the airbag module in a manner known in the art.

In this type of fastening of the gas generator to the diffuser, each head of each mounting projects into the interior of the pot-shaped diffuser through a slot configured in the side wall of the diffuser in such a manner that the gas generator, during its lateral movements, will come to a stop only on the respective head of a mounting. Each head resting on that wall area of the diffuser extends parallel to the flange sections of the gas generator.

To this end, it can be provided in particular that the width of each assigned slot configured in the side wall of the diffuser is dimensioned in such a manner that a peripheral section of the circularly configured head of the mounting projects into the interior of the diffuser and that the head supports itself on the edges of the slot next to the peripheral section.

Alternatively, it may be provided that the head of each mounting is arranged on the end of the mounting that is fastened to the flange section of the gas generator and that the head has a peripheral section that externally projects over the flange section of the gas generator, thereby forming the limit stop to the pot-shaped diffuser that laps over the gas generator.

Additional benefits and advantages of the present invention will become apparent to those skilled in the art to which the present invention relates from the subsequent description of the preferred embodiment and the appended claims, when taken in conjunction with the accompanying drawings.

BRIEF DESCRIPTION OF THE DRAWINGS

The drawing depicts an exemplary embodiment of the invention, which will be described below. The drawing shows.

DETAILED DESCRIPTION OF THE INVENTION

Figure 1:
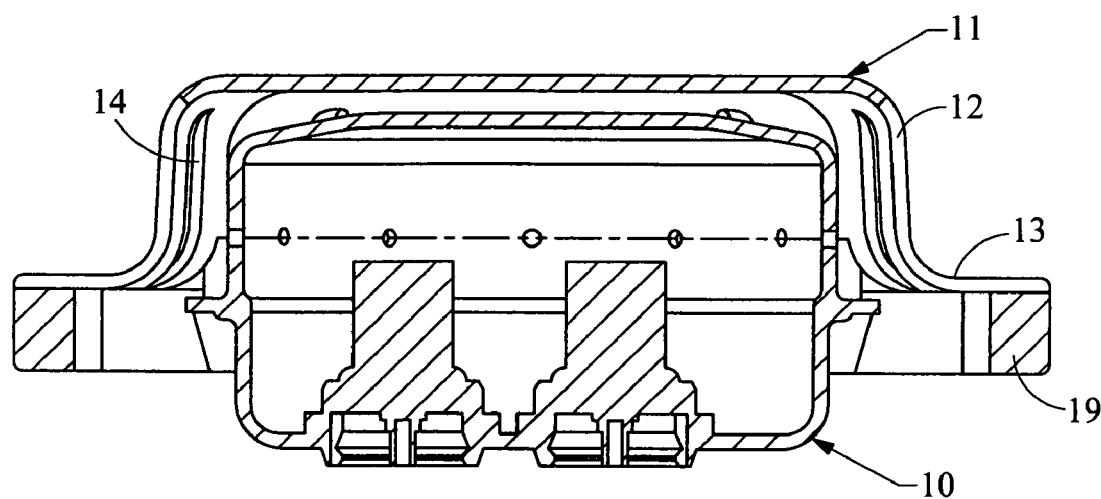
FIG. 1 is a cross-sectional view of the gas generator, including a diffusor lapping over it, as components of an airbag module without depiction of the vibration-damping mounting.
Figure 2:
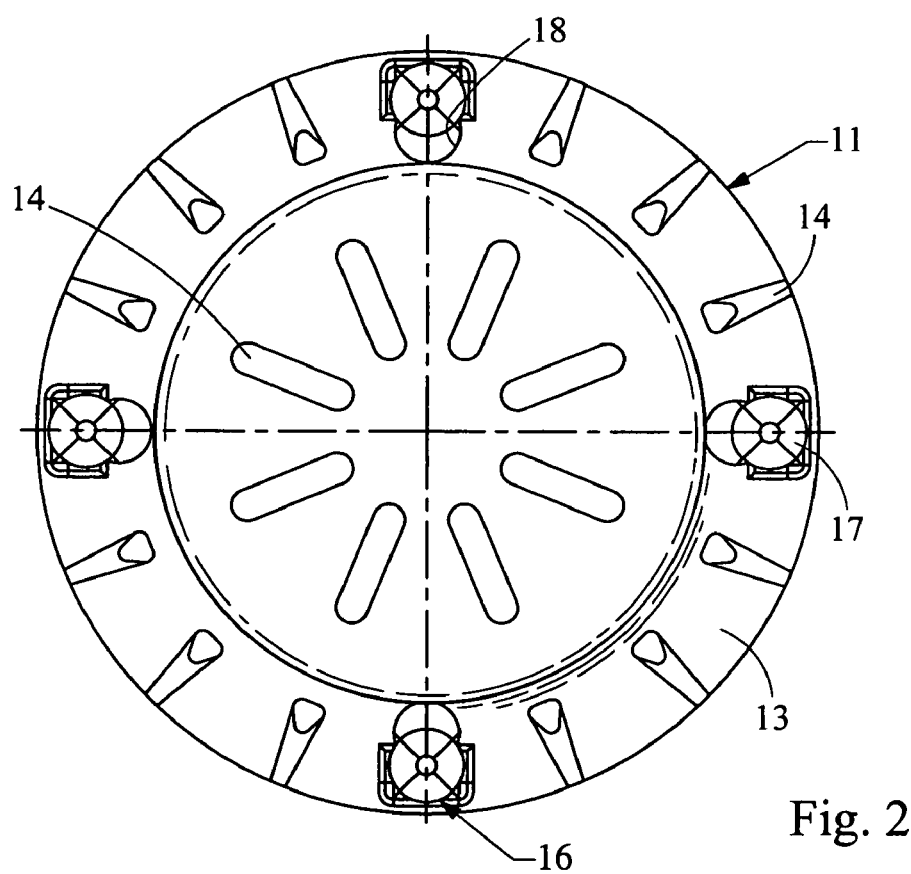
FIG. 2 is a top view of the diffusor.
Figure 3:
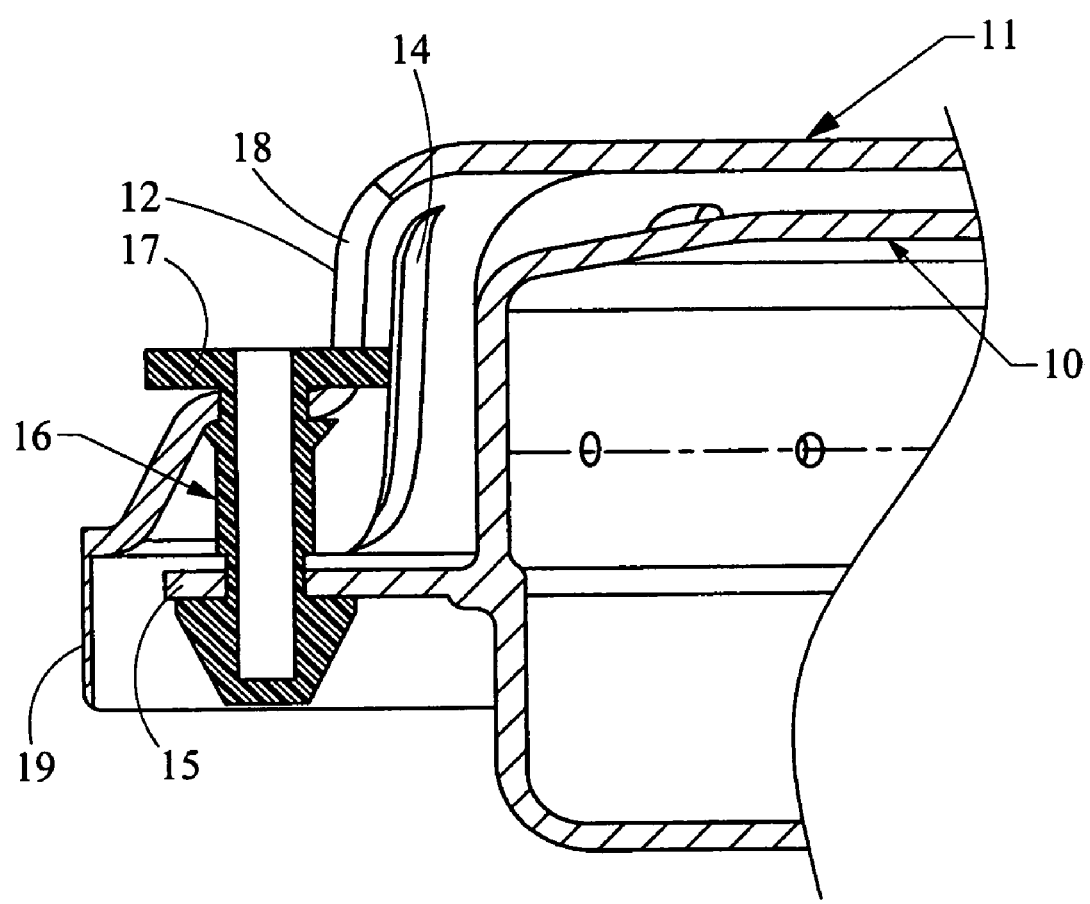
FIG. 3 is a cutout representation of the area in which the gas generator is fastened to the diffusor, this area including the mounting of this invention.

As shown in FIGS. 1, 2, and 3, a gas generator 10 is overlapped by a pot-shaped diffuser 11 and is housed therein, wherein the surrounding side wall 12 of the pot-shaped diffuser 11 laps over the gas generator 10 on its external perimeter with a radial spacing. The surrounding side wall 12 of the diffuser 11 is provided with a right-angle bend so that a diffuser flange 13, which extends parallel bath to the surface of the diffuser 11 and to the surface of the gas generator 10 is formed because of the bend on the side wall 12. The side wall 12 again blends into a surrounding external edge 19 of the diffuser 11.

Four star-shaped flange sections 15, which extend radially outwards and extend parallel although at a distance to the surrounding diffuser flange 13 of the diffuser 11, are arranged on the gas generator 10 for the purpose of fastening the gas generator 10 to the diffuser 11. It may alternatively be provided that a continuously surrounding flange be provided instead of the flange sections 15.

As evident from FIGS. 2 and 3, the fastening or floating suspension of the gas generator 10 to the diffuser 11 is accomplished in that one mounting 16 is connected to each flange section 15 of the gas generator 10. The mounting 16 rises up from its respective flange section and thereby extends through a hole arranged in the diffuser flange 13 of the diffuser 11, this wall area running parallel to the flange section 15 of the gas generator 10.

A head 17, which has a larger diameter than the remainder of the mounting 16 which will be explained in more detail below, is configured on the mounting 16 on the topside of the diffuser flange 13. The configuration of the mounting 16 having head 17 is established in such a manner that the mounting 16 is tightly connected with a positive fit, both to its assigned flange section 15 of the gas generator 10 and to the diffuser flange 13 of the diffuser 11.

As evident from FIG. 2, the diffuser 11 features gas flow slots 14 both on its top and in the vicinity of its side wall 12. The gas that the gas generator 10 releases when it is triggered, flows through slots 14 into the airbag which is connected to the diffuser 11, but is not further illustrated here.

In addition, slots 18 are configured in the sidewall 12 of the diffuser 11 in the vicinity of the heads 17 of the four mountings 16. The diameter of each head 17 and the width of its assigned slot 18 are matched to each other in such a manner that part of the perimeter of head 17 projects into the interior of the top-shaped diffuser 11 in such a manner that the gas generator 10 first hits the inwardly protruding peripheral section of head 17 during lateral movement and is thereby stopped from further movement. The gas generator 10 is thereby prevented from hitting the inside of the side wall 12 of diffuser 11.

By reversing the fitting arrangement of the head 17 of the mounting 16 depicted in FIG. 3, it is also possible to make the assignment so that the head 17 is arranged in the vicinity of the flange section 15. To this end, the head 17 of the mounting 16 must be configured in such a manner that a peripheral section of the head projects outwards over its assigned flange section 15 of the gas generator 10. When the gas generator 10 moves laterally relative to the diffuser 11, the head 17 and flange section 15 will jointly move toward the surrounding edge 19 of diffuser 11. The respective dimension is configured in such a manner that the external perimeter of head 17 will come to a stop on the edge 19 of the diffuser 11 before the gas generator 10 hits the inside of the side wall 12 of the diffuser.

While the above description constitutes the preferred embodiment of the present invention, it will be appreciated that the invention is susceptible to modification, variation and change without departing from the proper scope and fair meaning of the accompanying claims.

The invention claimed is:

1. An airbag module comprising, a gas generator mounted to a diffuser using at least one vibration-damping mounting, wherein the gas generator has a radially projecting generator flange section for receiving the vibration-damping mounting, the diffuser forms a pot-shaped configuration having a side wall bent to form a diffuser flange, the diffuser overlapping the gas generator with the side wall surrounding and radially spaced from the gas generator, the diffuser flange being generally parallel to the generator flange section, wherein one end of the vibration-damping mounting is provided with a head which acts as a limit stop for lateral movements of the gas generator that occur in the plane of the generator flange section.

2. An airbag module according to claim 1 wherein the gas generator is fastened directly to the diffuser and a plurality of vibration-damping mountings are distributed around the perimeter of the gas generator and diffuser, the plurality of vibration-damping mountings being fastened to the generator flange sections and passing through the diffuser flange in assigned slots and being connected to the diffuser.

3. An airbag module according to claim 2 wherein the head of at least one of the vibration-damping mounting projects into an interior of the diffuser through the assigned slots, the assigned slots being configured in the side wall of the diffuser in such a manner that the gas generator, during its lateral movements, will come to a stop on the head of a vibration-damping mounting, the head resting on the diffuser flange of the diffuser.

4. An airbag module according to claim 3 wherein the widths of the assigned slots configured in the side wall of the diffuser are dimensioned such that a peripheral section of a circularly configured head of the vibration-damping mounting projects into the interior of the diffuser and that the head supports itself on the edges of the slot next to the peripheral section.

5. An airbag module according to claim 2 wherein the head of the vibration-damping mounting arranged on the end of the vibration-damping mounting is fastened to the diffuser flange and the head has a peripheral section that externally projects over the generator flange section, thereby forming the limit stop for the gas generator.

* * * * *

UNITED STATES PATENT AND TRADEMARK OFFICE
CERTIFICATE OF CORRECTION

| | |
|---|---|
| PATENT NO. | : 7,341,273 B2 |
| APPLICATION NO. | : 11/059,020 |
| DATED | : March 11, 2008 |
| INVENTOR(S) | : Klaus Massanetz and Pavel Kurilow |

It is certified that error appears in the above-identified patent and that said Letters Patent is hereby corrected as shown below:

In column 4, line 28, Claim 2, after "flange", please delete "sections" and insert --section--.

Signed and Sealed this

Fifteenth Day of July, 2008

JON W. DUDAS
*Director of the United States Patent and Trademark Office*